Patented Aug. 26, 1924.

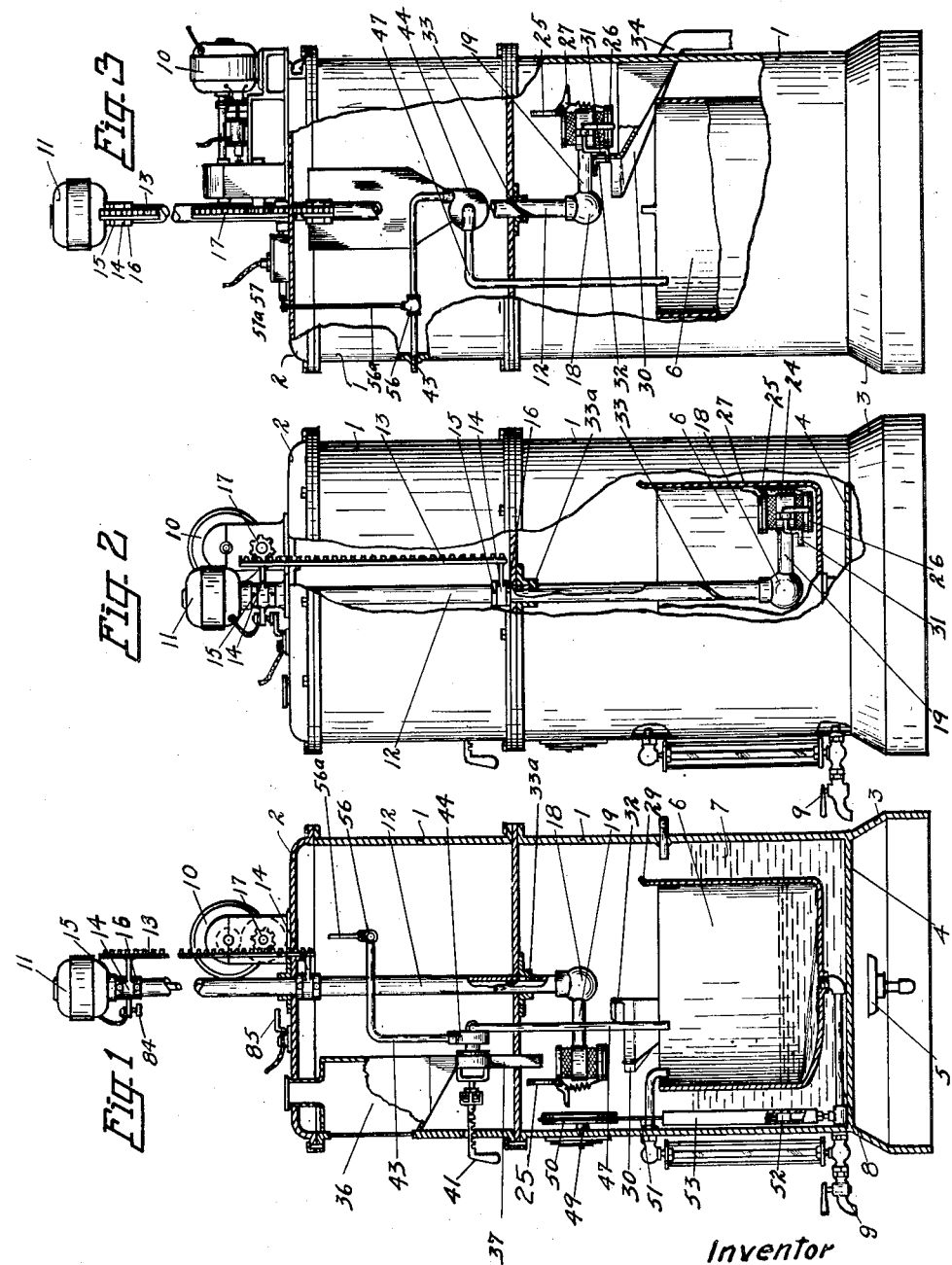
Aug. 26, 1924.
A. I. McALLEN
AUTOMATIC COFFEE DISPENSER
Filed Oct. 19, 1922    2 Sheets-Sheet 1

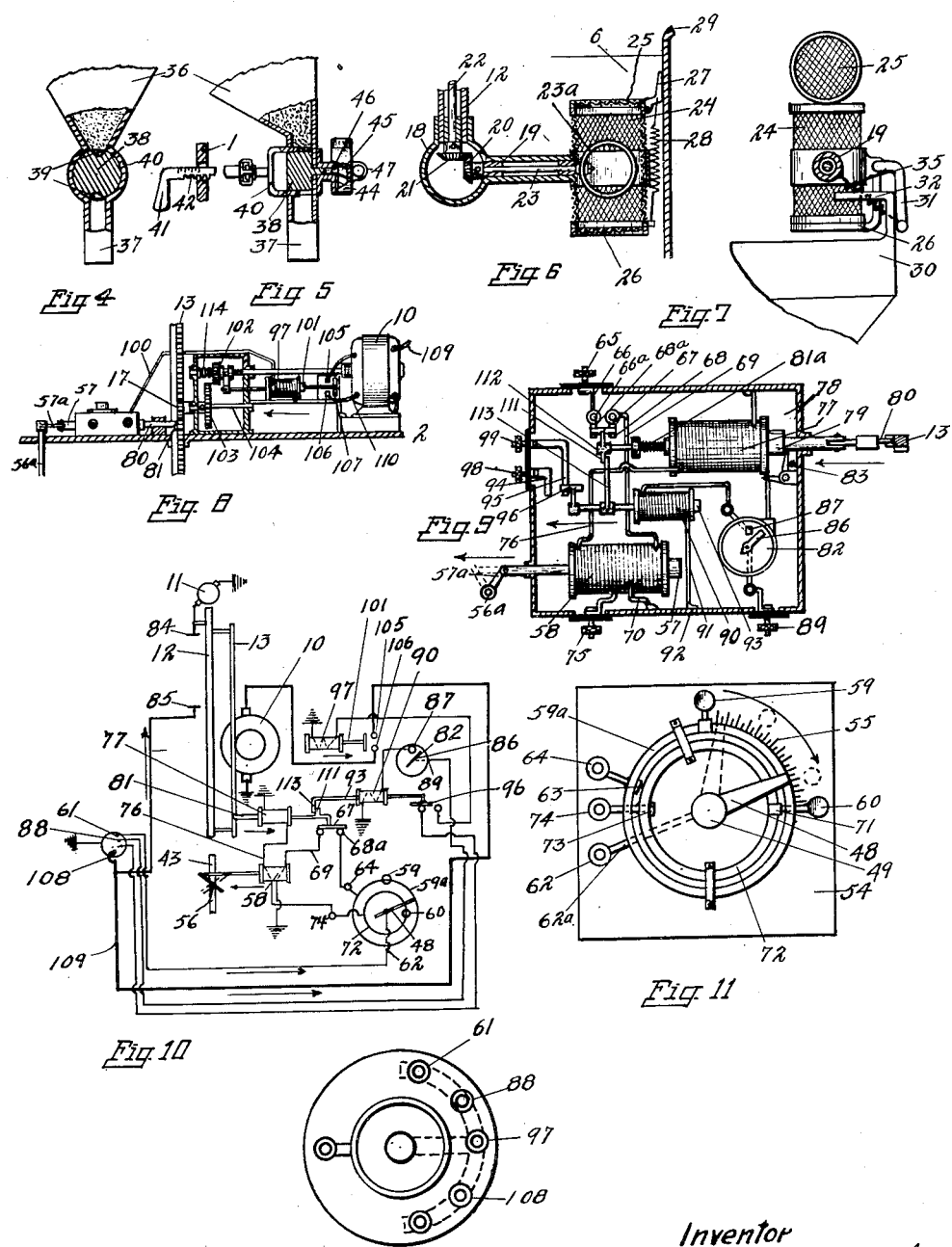

1,506,712

UNITED STATES PATENT OFFICE.

ANNA IRENE McALLEN, OF PORTLAND, OREGON.

AUTOMATIC COFFEE DISPENSER.

Application filed October 19, 1922. Serial No. 595,578.

*To all whom it may concern:*

Be it known that I, ANNA IRENE McALLEN, a citizen of the United States, residing at 179½ Bancroft Avenue, in the city of Portland, in the county of Multnomah and the State of Oregon, have invented a new and useful Automatic Circuit Dispenser, of which the following is a specification.

My invention relates to automatic coffee dispensing and making devices wherein means is provided for the setting of a dial on the outside of the mechanism for the amount or quantity of coffee that it is desired shall be made and by doing so the proper and specified amount of water is permitted to flow into the making chamber. At the same time, the desired amount of coffee is permitted to run into a perforated receptacle having a lid at both the top and bottom of the same, the upper lid being normally open, being held in the open position by the action of a spring, and the measured amount of coffee is permitted to flow into the open ended receptacle. The receptacle is then automatically lowered, the lid of the coffee containing receptacle being closed during the lowering action. When the low position is reached in the travel of the perforated receptacle, an agitating means is set in motion and the contents of the receptacle is violently agitated for a measured amount of time, after the elapse of which, the container is raised to the original position. During the process of raising, the bottom lid of the perforated container being opened at a specified point of its upward travel, the upper lid is also opened and the dregs are permitted to escape from the container, this being facilitated by the flow of water into the perforated container.

The coffee dispenser is automatic in its operation after the same is set in motion by the attendant, the dispenser being so arranged that the strength or amount of coffee flowing to the given amount of water to be used may be governed in order that each eating place or coffee drinking place may serve coffee to its patrons of the desired strength or proportion.

The prime movers shown in the drawings are electric devices, and in so far as is practical the operating mechanisms are contained within the case of the dispenser, the outward appearance of which may be made to look similar to the ones now in common use. When the dregs are permitted to escape from the perforated container, they flow to a connection leading to the exterior of the dispenser. On the exterior of the dispenser there is a water glass that enables the attendant to determine by observation the amount of coffee in the dispenser at all times.

The object of having the dispenser so arranged as to permit the making of different amounts of coffee at the will of the operator is in order that a nearly fresh supply of coffee may be on hand and served to the patrons at all times. During the slack period of the day, coffee may be made one serving at a time, and during the rush period a much larger amount may be made at each operation or making.

I attain these objects by the mechanism illustrated in the accompanying drawings in which—

Fig. 1 is a vertical section of the dispenser illustrating the different mechanisms in place in the case or jacket of the same. Fig. 2 is a side elevational view of the same with a part of the jacket or outer covering of the device broken away to show the arrangement of the parts in place in the interior of the same, showing the perforated receptacle for the ground coffee at the extreme down position. Fig. 3 is a side elevation of the assembled device with the jacket or outer covering partially broken away to show the interior with the ground coffee perforated container shown in position for the discharging of the dregs from the receptacle.

Fig. 4 and Fig. 5 are detailed sectional views taken at right angles to each other of the measuring devices for determining the amount of dry coffee to be measured into the perforated receptacle.

Fig. 6 is a detailed sectional view of the perforated coffee container showing the coffee agitating means therein.

Fig. 7 is an end view of the coffee container showing the mechanism for actuating the bottom closure when the same reaches directly above the receiving shoot for the dregs which leads directly to the exterior of the urn.

Fig. 8 is a detail sectional view of the gear box and the connection of the same with the prime mover for the elevating and lowering of the perforated coffee container.

Fig. 9 is a plan view of the electromagnetic controls for governing the various automatic functions that are set in motion once a cycle of operation is started.

Fig. 10 is a wiring diagram of the electric system and showing the various units of the electric system and the magnetic controls that are used in the system.

Fig. 11 is a front elevational view of the dial arrangement and the means of controlling the automatic operation of the machine.

Fig. 12 is a wiring terminal layout at the point of admission of the electric current to the terminal box.

Similar letters and numerals refer to similar parts throughout the several views—

1 is the outer jacket or case, 2 is the cover for the case, and 3 is the base of the same and 4 is the bottom against which the heat impinges directly for heating the jacket water; this heat may be furnished by a gas jet as shown at 5 or it may be accomplished through the use of an electric heating element or other suitable means and I do not wish to be limited to the use of a gas heating means. Suspended within the case is a kettle 6 in which the coffee is made, and around which a liquid 7 is maintained and which absorbs the heat directly from the heating means, and the heat for maintaining the coffee and the making of the coffee is derived from this outer heated liquid. A drain or drawing off means for tapping the coffee in the kettle is shown at 8 which connects directly with the low point of the kettle; this drain pipe terminates on the outer extremity with a cock 9 and by the operation of which coffee may be secured, when the same is available in the kettle.

10 is a prime mover, here shown as an electric motor, though I do not wish to be limited to an electric motor for this purpose as other, and suitable, prime movers may be used. This prime mover may be used for raising and lowering the agitating means and the perforated container, and for supplying the energy for the operations connected with the operation of the same. 11 is a second prime mover here shown, also, as an electric motor but, hereto, I do not wish to be limited to the use of an electric motor and state that any suitable motive power may be used. This prime mover is located at the upper end of the shaft that carrying the agitating means and the perforated coffee container, and as the same is raised and lowered this prime mover 11 is raised and lowered at the same time. 12 is a hollow shaft to which the prime mover 11 is directly attached by suitable means, and to the outer circumference of which is attached by suitable means, to permit the turning of the shaft freely through the supporting means, a rack 13, the free turning of the shaft being accomplished because of the band 14 surrounding the shaft between collars 15 and 16 which are rigidly attached to the shaft with a working fit between them and the collar which supports the bracket arm to which the rack is attached. To permit the free raising and lowering of the rack and the shaft with its attendant parts, a pinion 17 meshes with the rack, and the turning of this pinion in one direction will raise the rack and the reversing of the direction of rotation of the pinion will lower the rack, therefore, the raising and the lowering of the rack and its attendant parts is accomplished by the direction of rotation of the pinion 17. Terminating at the lower end of the hollow shaft 12 is a housing 18 and running at approximate right angles thereto is a second hollow shaft 19 which acts as a support for the perforated coffee container and at the same time a housing for a shaft. In order to provide a suitable driving vehicle at the change in direction from a vertical to a horizontal shaft bevel gears 20 and 21 are provided as shown in Fig. 6. Gear 21 is attached to vertical shaft 22 in the vertical shaft housing 12, and gear 20 is attached to the horizontal shaft 23 in the hollow shaft 19. The horizontal shaft housing 19 terminates on its one end in the ball shaped bearing 18 and has an upwardly directed boss forming a seat for the lower end of the shaft housing 12 to be fitted therein, and on the other end is provided suitable attaching means for the perforated coffee container 24. The coffee container 24 incloses an agitating ring 23$^a$ secured to the end of the shaft 23 within the container and has two closure lids 25 and 26, 25 being normally open and held in that position by the action of tension spring 28 being attached to the outer and lower edge of the container, and on its upper end to lever 27 which is attached to the lid about a pin in the usual manner. The normal action of the spring 28 is to hold the lid open, but it is essential for the lid to be closed during the period of agitation, else the dry coffee would float to the top and out of the container, or the wetted coffee would be thrown from the container during the period of agitation which also occurs during the time when the container is in the down position and immersed. The object of agitation is to make possible the extracting of the desirable ingredients of the coffee in the least possible time during immersion. The contacting of lever 27 with plate 29 on the down movement of the same closes the lid and maintains it closed until the up passage of the lever 27 clears the plate 29. The lower lid 26 is normally closed and remains in that position excepting when the desired position is reached in the up movement of the container which is directly over the mouth of the spout 30 at which time the arm 31 forming a hinging arrangement in the usual manner between the lid and the perforated container contacts with the arm 32 attached to the upper edge of the spout when these two arms contact with each other a turning action is imparted to the hinged arm 31 which causes the lower lid to become opened during the period of contact and, therefore, the discharge of the residue from the container. To accomplish the discharge of the contents from the container at the proper location it is necessary to partially rotate the shaft 12 in its upward travel which, in turn, partially rotates the container about the center of shaft as a pivotal center, this being accomplished by a race 33 being made in the outer periphery of the shaft 12, which contacts with a pin 33ª that is stationary and therefore, when the race engages the pin on the up travel of the shaft a rotating action is imparted to the shaft, and, therefore, the perforated container being attached to the shaft is rotated also, and during the rotation the arm connected with the hinged lower lid of the container is engaged with the trip arm that is stationary and attached to the upper edge of the discharge hopper and is tripped during the period of rotation that the perforated container and the residue of the coffee dregs are dumped or discharged into the hopper. The hopper has an outlet leading to the exterior as shown at 34, the lower lid of the container being held normally closed by the action of tension spring 35.

A measuring means is provided for accurately measuring the amount of dry ground or powdered coffee from the receptacle 36 which terminates in a spout or restricted opening, or outlet 37 and having a measuring rotating cylinder 38 superimposed above the outlet of the spout and having one or more measuring depressions 39 cut in the outer surface of the cylinder. The measuring cylinder rotates within a sleeve 40 which is adjustable in its longitudinal position, and by the shifting of the same in longitudinal placement the amount of opening exposed for receiving coffee will be increased or diminished, and therefore, the coffee of the desired strength may be made, as the number of turns that the measuring cylinder makes is proportional to the amount of water to be admitted to the kettle. Sleeve 40 is governed in its movement by the actuation of operating lever 41 having notches 42 cut to engage the stops corresponding in the case 1 of the dispenser. The measuring cylinder is actuated by the prime mover 45.

As heretofore stated the amount of water to be used in a new make of coffee and the amount of dry coffee bear a set relationship to each other, depending upon the various coffee drinking places and provision has been made to vary the amount of coffee to be used by adjusting or restricting the measuring device for the flow of the dry coffee into the perforated container through the use of which the coffee is immersed into the measured amount of water required for each make. In order to keep this relationship definite with the least number of parts and the consequent complication involved I have devised a plan wherein as the water to be used in a new make is being discharged into the coffee kettle, the same will pass through the prime mover, into the kettle where the same is discharged in a free state. The water is conducted, under pressure, into the automatic coffee dispenser, through the pipe 43, which is connected to the housing of the prime mover, this case is shown at 44 and has a prime mover or water wheel 45 therein which is attached to the shaft 46 of the measuring cylinder 38, and connected to the lower side of the case 44 is discharge pipe 47 which empties directly into the coffee kettle, it will thus be seen as the water that is to be used as a make for a new brew of coffee is a definite amount, that this definite amount in passing the prime mover will turn the same a definite number of revolutions and in doing so that it will in turn, turn the measuring cylinder a definite number of revolutions because of the fact that they are connected to each other, therefore I have devised a very simple device for the maintaining the relationship to the amount of water and dry coffee that are to be used in each brew, or new make of coffee, and whether the brew is to be a large make, or a small one, the definite relationship is maintained, and through the medium of restricting the measured amount as heretofore described compensation may be made for the different strength of dry coffee used by the respective coffee drinking places, or for the different strength of coffee that it is desired to serve.

In order that the dispenser may know at all times what amount of liquid coffee is in the kettle a dial is provided on the front of the case, in plain sight of the attendant, which is referred to as follows; 48 is the dial indicator mounted upon the dial face 54, the dial indicator being mounted upon the spindle 49 which is journaled within the frame or case 1 and is so arranged that a free and easy movement is permitted so as to make the same sensitive and easy moving. 50 is a drum attached to the spindle around which flexible chord 51 is lead, being attached to float 52, which operates within the tank 53, and since the float is of sufficient weight to operate the dial indicator through the action of the flexible chord and the drum the indicator is a sure means of the dispenser or attendant knowing the amount of liquid coffee being in the kettle at all times. The face of the dial 54 is graduated as shown at 55, each graduation indicating the number of units of coffee that is in the kettle. If the dial indicator is moved to the dotted position as shown in the dotted position in Fig. 11 the same becomes inoperative.

When it is desired to make a new brew of coffee the valve 56 is opened which admits the flow of water into the coffee kettle and which in passing from the valve to the kettle passes through the device that automatically measures the amount of dry coffee to be used in the new make or brew, this part of the operation having heretofore been described.

I will now describe a cycle of operation of the making of a brew of coffee assuming, in doing so that the kettle is empty of liquid and a complete cycle of operation is about to be started. When in this stage of the operation the float that is connected with the indicator upon the dial is at the bottom of the travel of the same, therefore the dial indicator arm is in the dotted position as shown in Fig. 11. While in this position a gap exists in the electric circuit and no electric current flows therefore all of the electric controls are in the inoperative positions and are, therefore, quiescent. The dial is set for the making of the maximum number of units of coffee by the placing of the terminal 60 at the end of the graduations, the arm 48 being also in the dotted position as shown in Fig. 11 which is at the other extreme of the graduated quadrant from the position of terminal 60. The terminal starting contact 59 is now moved around the quadrant until the same contacts with the arm 48, this movement of the terminal being in the direction of the arrow as shown on the face of the dial in Fig. 11. When this electric contact is made an electric circuit is closed and the electric current flows from the terminal 61 which is located in the power plug, which is connected by a suitable electric conductor preferably of heavily insulated marine cable so made as to resist shorts in the current when subjected to moisture, and steam, as both of these conditions will be existent in and around this automatic dispenser more or less at all times when the same is in operation and is shown at 62, this conductor connects terminal 61 with a terminal on arm 48 which is not here shown but it will be of the ordinary and standard type; this is accomplished through the conductor 62ª, thence to contact terminal 59 which is attached to ring 59ª and when the placement of 59 is changed from one position to another the ring itself is moved also, an electric contact being made through the ring by means of brush 63 which is connected to a suitable conduit or conductor to a terminal 64 thence through a proper conductor to a terminal 65 which is located upon the control box shown in Fig. 9, the current then passes through proper and suitable conductors 66 to brush 66ª and across contact bar 67 through brush 68 through terminal 68ª thence through conductor 69 and through electro magnet 58 from which point the conductor is grounded by the conductor 70 to the frame of the control box, thus causing the core 57 to move in the direction of the arrow as indicated in Fig. 9 and causes a complete cycle of operation as follows. The operation or actuation of lever 57ª which operates valve stem 56ª and operates and opens and closes the valve 56 for the admission of a measured amount of water so long as the pressure of the water to be admitted remains an approximate fixed pressure upon each individual automatic dispenser. The admission of water into the coffee kettle operates the float, and it in turn actuates the indicator upon the face of the dial and the indicator arm moves around the dial in the direction of the arrow until the same contacts with the terminal 60 at which point another circuit is closed and the current is conducted through arm 48 and the terminal leading therefrom through contact 71, thence through ring 72 and by means of brush 73 out through terminal 74 to terminal 75 to the electromagnet 58 which causes it to draw core 57 to the opposite position or to the normal position as shown in the drawing. The core in returning to its normal position closes the valve 56 and the flow of water to the coffee kettle is stopped and therefore the depositing of the ground coffee into the perforated container is likewise stopped because the measuring cylinder 38 ceases to revolve, therefore the proportionate amount of water and dry coffee have been metered. The water that has been measured flows to the kettle and the dry coffee deposited in the perforated container. At this time the electric current flows through conductor 76 to electromagnet 77 thence to the ground through conductor 78 which is grounded to the frame of the box. As this is accomplished the core 79 of the magnet 77 is actuated in the direction as indicated by the arrow, and in so doing the stop 80 is released from the seat or notch 81 of the rack 13 and the dry coffee contained in the perforated container and the perforated container with all of its accessories is caused to descend by the action of gravity to the bottom of its travel, and the dry coffee is immersed in the liquid in the kettle. At this same time the time meter 82 is set in motion to regulate the unit of time that the same shall remain immersed in the liquid and the amount of time that the same shall remain agitated during immersion.

The time meter 82 is released for one revolution or cycle of operation by means of the action of bell crank 83, this having been accomplished through the movement of the core 79. The single revolution of the wheel of the time meter determines the elapsed time of the immersion and agitation of the dry coffee in the liquid in the kettle, for during this time of immersion the agitating means is set in motion by the following action. When the component parts of the perforated container are permitted to gravitate to the low position an electric contact is made which energizes the motor 11 which in turn actuates the agitating means, the purpose of which is to make possible the extracting of the full strength of the dry ground coffee during the period of immersion which it is essential shall be a minimum of time. This is accomplished by bringing the terminal 84 into immediate contact with terminal 85 which completes the circuit and the motor 11 is set in motion and the agitating means heretofore described is begun, this agitation being continued until the time meter has made one complete cycle or revolution, at which time the perforated container and its component parts are started to be elevated to the starting point at which time the terminals 84 and 85 are disengaged and the circuit is broken and the motor and the consequent agitation ceases during the remaining cycle of operation.

When the time meter has made one complete cycle of operation which is one complete revolution, the contact arm 86 contacts with terminal 87 which closes the circuit through contact 87, the current flowing from the power plug terminal 88 through a suitable conductor 89 thence through the contact arm 86 and then through the electromagnet 90 and out by means of the conductor 91 which is grounded to the frame at 92, and in so doing the core 93 is drawn in the direction of the arrow, thereby contacting the bus bars 94 and 95 by contact bar 96. This circuit energizes electromagnet 97 through the circuit as follows; current is taken from the plug at terminal 97 and is conducted by suitable conductor to terminal 98 through a suitable conductor by means of the contact bars 94 and 96 and 95 out by way of terminal 99 by means of conducting means 100 and thence through electromagnet 97 thence to the ground, thus energizing the magnet causes the core 101 to move in the direction of the arrow at the same time throwing the gear 102 in mesh with gear 103 which is secured to shaft 104, to cause the pinion 17 to rotate. The object of this train of gears is to lessen the speed of the motor and therefore lessen the speed by which the perforated container and its component parts to be raised into its up position as it is desired to lessen this speed somewhat because of the fact that the container is to have the lower closure opened and its contents discharged during the upward travel of the same. When the core is moved in the direction of the arrow as shown at 101 the core not only causes the gears to mesh as described but at the same time the motor 10 is caused to operate by the action of the core contacting the terminals 105 and 106 through the contact arm or bar 107. The current for operating the motor is derived by the following terminal and conduit system. The current is taken from the terminal 108 through conductor 109 thence to the motor 10 to the contact arm 105 by means of contact bar 107 to contact 106 through conductor 110 through the motor and is then grounded. When the motor is operated it will thus be seen that the perforated container and its full component parts will be drawn to the full up stroke of the same. When the full up stroke has occurred the release bar 80 drops into notch 81 by the action of the spring 81ᵃ located on the rack 13 at which time projection arm 111 carried by the member 112 which is on the outer end of the core 79 and also supports the contact bar 67 and in so doing the core 79 is permitted to move in the direction of the arrow to break the contact, the current ceasing to pass through the motor and it is stopped by the following action. The projection arm 111 pulls arm 113 which is journaled to the core 93 of the electromagnet 90 and in so doing when the core is actuated draws the contact bar 96 in the same direction and breaks the electric contact and the current for the following reasons. Gears 102 and 103 are held in mesh by the action of spring 114 against the core of the electromagnet 97 and the spring 114, until the contact bar and the contact is broken by the action of the core 79. When the circuit is broken the spring 114 disengages the gears 102 and 103 also actuating the core in the opposite direction as indicated by the arrow and breaking the contact 105 and 106 and at the same time stopping the motor.

Having thus described the action of a cycle of operation of my automatic coffee dispenser in complete detail I will now describe in a general way and in simple terms a cycle. Assuming that the kettle is empty of liquid and that the perforated container is also empty but in position under the hopper and with the lid in normal or open position for receiving the measured coffee as the same is measured therein by the action of the revolving measuring cylinder when set in motion. The two electric terminals located upon the dial are set, one to regulate the maximum amount of coffee to be made at the brew, the other to regulate the minimum amount of coffee to remain in the kettle while a new brew is being made, and the indicator arm is then contacted with the terminal at the minimum side of the dial and at this point a train of automatic actions are set in motion which are substantially as follows. An electromagnet is energized which turns on the water by opening a valve, and as the water passes through the valve thus opened it passes through or past a water motor that is attached to a measuring cylinder located and rotating within the chamber containing the dry ground coffee and as the water runs the coffee is deposited in proportionate amounts in the perforated container. As the water runs in the kettle the float is raised and therefore the dial indicator is rotated clock wise around the dial until an electric contact is made between the indicator and the electric terminal at which point the current is changed and a release is made of the valve controlling the inflow of water and the same is shut off, and at the same time an electro magnet core is operated and the perforated container is released and the same descends, and in doing so the closure lid that is normally open is closed. At the time of its reaching the lowest point on its descension, an electric contact is made and a motor is actuated and at the same time an agitation is set up in the perforated container, this immersion and agitation being continued until a time meter makes one complete revolution at which time the electric contact is made that sets the motor that elevates the perforated container in motion. At the same time another electric contact is broken and the agitation is stopped. The perforated container is then raised and during its ascent the same is partially rotated radially and at a predetermined point the lower closure cover is opened and the dregs or residue is permitted to be discharged into a hopper that leads to the exterior of the automatic dispensers case; when the perforated container left the kettle on its upward travel the upper closure lid, or cover, returned to its normal open position; the upward travel of the perforated container continues until the normal position of the same reaches the position directly beneath the discharge of the dry coffee spout and during this latter movement, the lower closure lid is permitted to return to its normal position of being closed. When the the full upward travel point is reached the current is shut off and all electrical circuits are broken in which condition they will remain until the indicator on the dial returns to the low level to be maintained in the kettle at which time the circuit is again made and a complete cycle of operation is again set in motion.

Having thus made a complete disclosure of my invention and so complete that any one skilled in the art may construct one I wish to make the following claims therefor:

1. The combination in an automatic coffee dispenser, of a casing inclosing a kettle, cooperating means for delivering water to the kettle and proportionately delivering coffee to a container, means for agitation of the coffee during immersion of the container in the kettle, means for regulating the time of immersion and agitation, means for the discharge of the dregs after immersion and means for returning the container for dry coffee to normal position with same in position with the closure lid open.

2. The combination in an automatic coffee dispenser, of a case having a water tight jacket adjacent its lower portion, means for heating the water contained within the water jacket, means suspended within the water jacket and having outlets therefrom with controllable means for the drawing off, at will, of the contents thereof, means for the admission therein of measured amounts of liquids controllable in advance as to the amount to be admitted, automatic means for governing the amount of dry coffee to be admitted within a perforated container, and means for retaining the dry coffee in the container, and the immersion thereof within the previously admitted liquid, governing means for the time of immersion, means for agitating the contents during immersion, means for the removal after agitation and means for elevating the coffee containing and agitating means to the point of start, and means for discharging the dregs during elevation, all for the purpose as specified and described.

3. The combination in an automatic coffee dispenser, of a container for dry ground coffee superimposed directly above an automatic governable measuring device so arranged as to deliver a measured amount of the contents therefrom, a perforated container to receive the coffee having an automatic closure on either end for opening and closing, coffee agitating means within the perforated container, a kettle, means for the admission of water of a predetermined amount into the kettle surrounded by water and having means of imparting heat thereto, means for immersing the perforated container and contents in the liquid within the kettle, means for agitating the contents during immersion, means for removing the perforated container from the liquid and the discharging of the dregs during its return to the starting position and means for drawing off the coffee after making.

4. The combination in an automatic coffee dispenser of a dispenser case having a water compartment at its lower end and having means for heating the water contained within the case, a kettle surrounded by the water within the case, means for feeding water to the kettle, a perforated coffee container shiftably mounted in the case, a float, the elevation of which is determined by the elevation or level of the brewed coffee, settable indicator means connected with the float including an indicator upon a dial located exteriorly of the case of the dispenser, a graduated face upon the dial and electric terminals mounted thereon, and means for contacting the dial indicator with the electric terminals, a series of electromagnets, and electric motors that are set in motion, the operations of which are synchronized to cause a measured amount of water to be deposited within the heated kettle, and the deposit of a measured amount of dry coffee to be placed within the open perforated container, and operating the aforesaid elements in the manner described.

5. The combination in an automatic coffee dispenser, of a water jacketed kettle, means for feeding a measured quantity of water to the kettle, a perforated coffee container having closure lids on each end, agitating means within the container, automatic means for lowering the coffee container into the kettle and governing the amount of time that the perforated container remains immersed within the water within the kettle and is agitated, automatic means for the removal of the perforated container from the kettle, means for permitting the return of the upper closure cover from closed to open position, means for partially rotating the perforated container radially during its elevation and during rotation to open the bottom closure cover to permit the discharge of the dregs from the container at a predetermined position a hopper containing dry coffee, and means for spotting the perforated container, with the upper closure cover open, directly beneath the spout leading from the measuring device at the lower part of the hopper containing the dry coffee, all for the purpose as specified and described.

6. The combination in an automatic coffee dispenser, a kettle, a perforated coffee container, cooperating means for delivering a predetermined quantity of water to the kettle and a proportionate amount of coffee to the container, agitating means for the coffee in the container, means for lowering the container into the kettle and raising the same therefrom, means for opening the coffee container, of a dial disposed exteriorly of the dispenser having movable electrical contacts, and a rotatable indicator, and a float within the dispenser associated with the indicator in a manner to cause the indicator alternately to engage the contacts for the making and breaking of electrical circuits to effect operation of the aforesaid elements.

7. The combination in an automatic coffee dispenser, a kettle, a perforated coffee container, cooperating means for delivering a predetermined quantity of water to the kettle and a proportionate amount of coffee to the container, agitating means for the coffee in the container, means for lowering the container into the kettle and raising the same therefrom, means for opening the coffee container, of a dial disposed exteriorly of the dispenser embodying a pair of spaced adjustable contacts and a movable contact arm and electric circuits including the contacts and arm with the dial initially set to start a series of electric automatically controlled operations in operating the aforesaid elements whereby coffee will be made in recurring intervals and a float in the dispenser for operating the contact arm of the dial.

8. The combination in an automatic coffee dispenser, a kettle, a coffee hopper and measuring device, means for feeding water to the kettle, a perforated coffee container shiftable in the dispenser and adapted to be immersed in the kettle, means for proportioning the quantity of water delivered to the kettle and amount of coffee delivered to the perforated container, and automatic electrically operated devices for lowering and raising the container with respect to the kettle.

9. The combination in an automatic coffee dispenser, a kettle, a coffee hopper and measuring device, means for feeding water to the kettle, a perforated coffee container shiftable in the dispenser and adapted to be immersed in the kettle, means for proportioning the quantity of water delivered to the kettle and amount of coffee delivered to the perforated container, automatic electrically operated devices for lowering and raising the container with respect to the kettle, and means for discharging the coffee dregs in the perforated container outwardly of the dispenser during upward movement thereof.

10. The combination in an automatic coffee dispenser, a kettle, a coffee hopper and measuring device, means for feeding water to the kettle, a perforated coffee container shiftable in the dispenser and adapted to be immersed in the kettle, means for proportioning the quantity of water delivered to the kettle and amount of coffee delivered to the perforated container, automatic electrically operated devices for lowering and raising the container with respect to the kettle, and manually operable means for varying the relative proportions of coffee and water to vary the strength of the coffee.

11. The combination in an automatic coffee dispenser, a kettle, a coffee hopper and measuring device, means for feeding water to the kettle, a perforated coffee container shiftable in the dispenser and adapted to be immersed in the kettle, means for proportioning the quantity of water delivered to the kettle and amount of coffee delivered to the perforated container, automatic electrically operated devices for lowering and raising the container with respect to the kettle, means for discharging the coffee dregs in the perforated container outwardly of the dispenser during upward movement thereof, and manually operable means for varying the relative proportions of coffee and water to vary the strength of the coffee.

12. The combination in an automatic coffee dispenser, a kettle, a coffee hopper and measuring device, means for feeding water to the kettle, a perforated coffee container shiftable in the dispenser and adapted to be immersed in the kettle, means for proportioning the quantity of water delivered to the kettle and amount of coffee delivered to the perforated container, automatic electrically operated devices for lowering and raising the container with respect to the kettle, said automatic electrically operated devices including a settable dial embodying adjustable spaced electric contacts and a contact dial arm, and a float device associated with the dial arm.

13. The combination in an automatic coffee dispenser, a kettle, a coffee hopper and measuring device, means for feeding water to the kettle, a perforated coffee container shiftable in the dispenser and adapted to be immersed in the kettle, means for proportioning the quantity of water delivered to the kettle and amount of coffee delivered to the perforated container, automatic electrically operated devices for lowering and raising the container with respect to the kettle, means for discharging the coffee dregs in the perforated container outwardly of the dispenser during upward movement thereof, said automatic electrically operated devices including a settable dial embodying adjustable spaced electric contacts and a contact dial arm, and a float device associated with the dial arm.

14. The combination in an automatic coffee dispenser, a kettle, a coffee hopper and measuring device, means for feeding water to the kettle, a perforated coffee container shiftable in the dispenser and adapted to be immersed in the kettle, means for proportioning the quantity of water delivered to the kettle and amount of coffee delivered to the perforated container, automatic electrically operated devices for lowering and raising the container with respect to the kettle, manually operable means for varying the relative proportions of coffee and water to vary the strength of the coffee, said automatic electrically operated devices including a settable dial embodying adjustable spaced electric contacts and a contact dial arm, and a float device associated with the dial arm.

15. The combination in an automatic coffee dispenser, a kettle, a coffee hopper and measuring device, means for feeding water to the kettle, a perforated coffee container shiftable in the dispenser and adapted to be immersed in the kettle, means for proportioning the quantity of water delivered to the kettle and amount of coffee delivered to the perforated container, automatic electrically operated devices for lowering and raising the container with respect to the kettle, means for discharging the coffee dregs in the perforated container outwardly of the dispenser during upward movement thereof, manually operable means for varying the relative proportions of coffee and water to vary the strength of the coffee, said automatic electrically operated devices including a settable dial embodying adjustable spaced electric contacts and a contact dial arm, and a float device associated with the dial arm.

ANNA IRENE McALLEN.